United States Patent

Block

[15] 3,661,530

[45] May 9, 1972

[54] PREPARATION OF FREE-FLOWING SULFUR COMPOSITION

[72] Inventor: Michael J. Block, Fullerton, Calif.

[73] Assignee: Union Oil Company of California, Los Angeles, Calif.

[22] Filed: Apr. 28, 1970

[21] Appl. No.: 32,747

[52] U.S. Cl..............................................23/224, 424/162
[51] Int. Cl. ......................................................C01b 17/10
[58] Field of Search ...........................23/224, 229, 308, 312; 252/189, 381, 384; 117/100; 424/162, 164

[56] References Cited

UNITED STATES PATENTS

| 2,022,796 | 12/1935 | Wieder | 424/164 |
| 1,585,058 | 5/1926 | Volek | 424/164 |
| 2,614,908 | 10/1952 | Railsback | 23/224 |
| 2,608,471 | 8/1952 | Carney | 23/224 |

FOREIGN PATENTS OR APPLICATIONS

| 1,096,599 | 12/1967 | Great Britain | 23/224 |

OTHER PUBLICATIONS

Ekonomopoulos; N. P.; " Industrial & Engineering Chemistry"; Vol. 44, No. 1; Jan. 1952; pp. 105– 106

*Primary Examiner*—Oscar R. Vertiz
*Assistant Examiner*—G. O. Peters
*Attorney*—Milton W. Lee, Richard C. Hartman, Lannas S. Henderson, Dean Sanford and Robert E. Strauss

[57] ABSTRACT

Preparation of a free-flowing sulfur composition consisting essentially of particulate rhombic sulfur and a hydrocarbon having from about 6 to 50 carbon atoms in an amount sufficient to prevent caking of the sulfur is described herein.

6 Claims, No Drawings

PREPARATION OF FREE-FLOWING SULFUR COMPOSITION

DESCRIPTION OF THE INVENTION

This invention relates to a free-flowing particulate sulfur composition and, more particularly, relates to a free-flowing, dusting sulfur composition containing an anticaking additive.

Powdered sulfur is used extensively in agriculture as an insecticide and fungicide. In conventional applications, the sulfur is applied to the plant to coat its foliage with a uniform layer of fine, powdered sulfur.

The common practice is to disperse the sulfur in a gaseous suspension about the plants using a blower or airplane. Proper operation of this equipment requires that the sulfur be free-flowing and be uniformly subdivided.

It is well known that pure sulfur when sufficiently subdivided for agricultural dusting has a strong tendency to agglomerate during storage and handling and to form lumps of widely varied dimensions. The presence of these lumps is objectionable in the dusting operation since they tend to plug the dusting machines causing their malfunction and inhibiting even distribution of the powdered sulfur over the plants.

It is impractical to grind or classify the sulfur into particles of uniform size at the time of application, and, hence, the sulfur must be ground into a uniformly subdivided state at the manufacturing plant and maintained as a free-flowing powder during storage, handling and spreading. It is during the storage and handling of the powdered sulfur when the objectionable caking occurs which interferes with the subsequent use of the sulfur.

Extensive work has been done to obviate some of the above-mentioned problems. It has been proposed, for example, to incorporate solid, inert particles such as silica, talcum, magnesium carbonates, calcium phosphates, zinc salts, ground oyster shells, etc., into the powdered sulfur to physically separate the sulfur particles. While these inert solids reduce caking, the amount of inert solid required to adequately prevent caking reduces the purity and, in some instances, the biocidal effectiveness of the sulfur. It has also been suggested in U.S. Pat. No. 3,012,985 to add a latex binder to powdered sulfur to form a cohesive agglomerate which can be dried and pelletized. The sulfur pellets, however, are not useful in agricultural dusts and the sulfur must be again subdivided for use in dusting operations. The presence of the latex binder imparts attrition resistance to the pellets so that the subsequent regrinding is seriously impaired. The presence of the latex binder makes it difficult to obtain finely divided sulfur particles within the dusting size range and the high cost of latex binders would, in many cases, render this method economically prohibitive.

Accordingly, a need exists for an additive which can be mixed with the powdered sulfur to prevent or substantially reduce caking, which does not significantly reduce the purity or biocidal effectiveness of the sulfur, which can be easily and uniformly mixed with powdered sulfur, and which is relatively inexpensive.

It is therefore an object of this invention to provide free-flowing sulfur composition.

It is another object of this invention to provide an anticaking additive to be added to powdered sulfur.

It is an additional object of this invention to provide an improved, free-flowing sulfur composition containing an anticaking additive which can be used as agricultural dusting sulfur.

Other objects and advantages of this invention will be apparent to those skilled in the art from the description thereof which follows:

The aforementioned objects and their attendant advantages can be attained with a powdered sulfur composition containing a minor amount of a hydrocarbon having at least 6 carbon atoms. While hydrocarbon olefins have been used in polymeric sulfur to retard its reversion back to the crystalline forms at ambient temperatures (U.S. Pat. No. 2,757,075), it was quite unexpected that a minor amount of a hydrocarbon would be useful in agricultural dusting sulfur, which is generally rhombic and devoid of sulfur in the polymeric form. It was particularly surprising to discover that a hydrocarbon liquid or tacky wax or tar would reduce, rather than increase, the caking properties of the sulfur.

The hydrocarbon component of this invention has at least 6 and preferably less than about 50 carbon atoms, and more preferably has from about 10 and 40 carbon atoms and may be aliphatic, alicyclic, aromatic or combinations thereof. Exemplary hydrocarbons which may be employed in accordance with this invention include paraffins such as hexane, heptane, octane, nonane, decane, undecane, dodecane, tetradecane, hexadecane, octadecane, nonadecane, eisosane, docosane, tetracosane, hexacosane, octacosane, tetratriacontane, tetracontane, pentacontane, etc., and isomers thereof; olefins such as hexene, heptene, octene, nonene, decene, dodecene, tetradecene, hexadecene, octadecene, eisocene, docosene, hexacosene, etc., and isomers thereof; alicyclic hydrocarbons such as cyclohexane, cycloheptane, cyclooctane, cyclononane, methylcyclohexane, ethylcyclohexane, propylcyclohexane, ethylcycloheptane, isopropylcyclohexane, butylcycloheptane, etc. and aromatic hydrocarbons such as benzene, toluene, xylene, ethyl benzene, propyl benzene, butyl benzene, amyl benzene, hexyl benzene, 1-propyl-2-methyl benzene, 1-butyl 3-propyl benzene, diphenyl methane, cyclohexylbenzene, naphthalene, anthracene, phenanthrene, etc.; and mixtures of the above.

Hydrocarbons which are particularly preferred anitcaking additives are high-boiling petroleum products or distillates with boiling points and average carbon atoms within the range presented in Table I.

TABLE I

| | Preferred | More Preferred | Most Preferred |
|---|---|---|---|
| Boiling Point Range (° F) | 120–1200° | 250–1100° | 400–1000° |
| Carbon Number Range[1] | 6–50 | 10–40 | 20–35 |

[1]The average number of carbon atoms per molecule.

Exemplary high boiling petroleum products and distillates within the scope of this invention include crude oil, reduced crude oil, residuum, naphtha, diesel oil, fuel oil, light and heavy gas oil, kerosene, jet fuel, mineral oil, 80 to 300 neutral lube oil, paraffin waxes, etc.

The hydrocarbon anticaking additive can be mixed with the sulfur particles directly, however, in order to obtain a uniform distribution of the additive throughout the sulfur particles, it is preferred that the hydrocarbon be applied as a solution or dispersion in a low molecular weight organic liquid. The low molecular weight organic liquid is then allowed to vaporize from the sulfur mixture, leaving a substantially uniform distribution of hydrocarbon on the sulfur particles.

Generally, any organic liquid which can solubilize the hydrocarbon additive and also vaporize from the sulfur particles at a lower temperature than the hydrocarbon anticaking additive may be employed. Exemplary liquids include alkanes having from about 2 to 6 carbon atoms, such as ethane, propane, butane, pentane, etc.; halogenated alkanes having from about 2 to 6 carbons, such as chloroethane, dichloroethane, chloropropane, bromopropane, dichloropentane, etc.; and alkanols having from about 2 to 6 carbons, such as ethanol, isopropyl alcohol, butylalcohol, sec-butyl alcohol, amyl alcohol, etc.

Ethers having between 2 to 6 carbon atoms can also be employed as the organic liquid, and include, dimethyl ether, diethyl ether, dipropyl ether, diisopropyl ether, methyl propyl ether, methyl ethyl ether, etc.

Various esters having between 2 and 6 carbon atoms can also be employed and include ethyl formate, methyl acetate, ethyl acetate, n-propyl formate, iso-propyl formate, n-propyl acetate, ethyl propionate, n-propyl acetate, sec-butyl acetate, iso-butyl acetate, ethyl n-butyrate, n-butyl acetate, n-butyl formate, methyl n-butyrate, propyl n-butyrate, etc.

Another class of organic liquids that have sufficient solvency for the hydrocarbon additive are various amides having from 2 to 6 carbons, such as formamide, dimethyl formamide, ethyl isopropyl formamide, acetamide, isobutyramide, N-ethylisobutyramide, N,N-diethylacetamide, etc.

In an alternative method of admixing the hydrocarbon additive with sulfur particles, an emulsion of the hydrocarbon in water is formed with the aid of an effective amount of an emulsifying agent. The emulsion is sprayed over the sulfur particles and mixed at an elevated temperature for a sufficient period to vaporize the water from the mixture. The elevated temperatures employed herein is generally between 75° and 150° F., however, other temperatures may be employed with the maximum temperature being just below the melting temperature of the sulfur.

In another embodiment of this invention, the hydrocarbon additive is admixed with large macroparticles of sulfur having an average weight size greater than 10 mesh U. S. Standard sieve but less than 1 square inch. The coated macroparticles can be later ground into a fine powder having a size suitable for dusting sulfur while realizing the beneficial effect of the hydrocarbon additive on the free flowing properties of the sulfur. The hydrocarbon additive can be sprayed directly onto the macroparticles or in a preferred embodiment it can be applied concurrently with the formation of the macroparticles. A particularly useful macroparticle is the so-called Popcorn sulfur which is formed by cooling molten sulfur droplets with a fast moving stream of cool water in the vapor space. These particles have a high pore volume, usually between about 0.06 and 0.20 cubic centimeters per gram, which are advantageous in this invention since this type of particle can more uniformly disperse the hydrocarbon additive throughout the sulfur matrix. The method and apparatus for producing Popcorn brand sulfur is fully disclosed in a commonly assigned copending application Ser. No. 846,141, filed July 30, 1969 which is herein incorporated by reference. This method, briefly, comprises injecting a molten sulfur composition into the vena contracta of a discharging orifice carrying a high velocity cooling water stream. The discharging end of the orifice is directly vented to a vapor space such as the atmosphere so as to allow the sulfur to cool while suspended in a gaseous medium. Generally the water velocity is maintained within the range of 10–90 feet per second with the mass flow rate of sulfur being maintained from about 5 to 150 parts of sulfur per 100 parts of water. By forming the particles of sulfur by this method, a highly porous solid particle can be obtained having the properties highly suitable for dispersing the hydrocarbon additive of this invention.

The hydrocarbon additive can be applied to the sulfur particles concurrently with the particle formation. In this method the additive is dispersed in the cooling water at a concentration effective to coat the particles with the desired amount of hydrocarbon. This concentration can vary over a wide range depending upon the amount of water employed to cool the molten sulfur. Generally this concentration ranges from about 0.004 to 100 parts of hydrocarbon per 100 parts of water and preferably from about 0.01 to 10 parts of hydrocarbon per 100 parts of water. The amount of hydrocarbon employed is selected so that during operation between about 0.01 and 5 parts of hydrocarbon is dispersed in the water for each 100 parts of particulate sulfur.

The molten sulfur is sprayed into a vapor space along with an effective amount of the cooling water and dispersed hydrocarbon. During this process the hydrocarbon additive comes into contact with the developing sulfur particles. The particulate sulfur made by this procedure is discharged into a pile and the water is allowed to drain and vaporize off while the hydrocarbon additive remains as a discontinuous coating on the particles. The water drained from the sulfur piles can be recirculated and admixed with additional hydrocarbon additive for reuse, and in instances where an appreciable amount of hydrocarbon is washed off the sulfur by the cooling water it is generally advantageous to recover and reuse the water. The particulate sulfur prepared by this procedure can then be ground and classified to realize a free flowing dusting sulfur composition.

It is essential that the amount of hydrocarbon additive distributed onto the sulfur particles be maintained at concentrations less than 5 weight percent and preferably less than 2 weight percent and more preferably between about 0.01 and 1 weight percent of the mixture. When high boiling petroleum distillates boiling above 250° F. are employed as the hydrocarbon additive, it has been found that the optimum amount of additive is between about 0.1 and 1.0 weight percent of the sulfur mixture.

In addition to the anticaking additive, other additives can be incorporated with the powdered sulfur composition without nullifying the anticaking properties of the hydrocarbon additive or the biocidal effectiveness of the particulate sulfur. One such additive is a hydrocarbon antioxidant which prevents or reduces the oxidation of the hydrocarbon additives which may occur during long periods of storage. Exemplary antioxidants include substituted phenolic compounds such as butylated hydroxyanisole, di-tert-butyl-paracresol, propyl gallate, 2,6-di-tert-butyl 4-methyl phenol; 2,6-tert-butyl phenol, 4,4'-methylene bis (2,6-di-ter-butyl) phenol, 2,6-di-tert-butyl 4-dimethylaminomethyl phenol, 2,2'-methylene bis(4-methyl-6-tert-butyl)phenol, di-tert-octyl disulfide, diphenyl disulfide, dibenzyl sulfide, N,N'-di-beta-naphthyl paraphenylene diamine, phenyl α-naphthylamine, N,N'-di-sec-butyl paraphenylene diamine, etc. These additives are only necessary in minute quantities and usually in an amount less than about 2 weight percent of the hydrocarbon component employed.

Various emulsifying agents can be employed to disperse the hydrocarbon ingredient in the solvent and also throughout the sulfur matrix without adversely effecting the anticaking properties of the hydrocarbon additive. Preferably about 1 to about 10 parts of an oil-soluble or oil-dispersible emulsifier per 100 parts of the hydrocarbon ingredient is employed. It is recognized that the inclusion of this emulsifier is not critical to the invention and can be entirely eliminated from the anticaking additive, however, in many instances, the inclusion of an emulsifier improves the anti-caking properties of the hydrocarbon additive. As apparent to those skilled in the art, a host of suitable emulsifiers are available, a few of which are listed as follows:

Anionic compounds obtained by sulfonation of fatty derivatives such as sulfonated tallow, sulfonated vegetable oils, sulfonated marine animal oils. Commercially available emulsifiers of this group are Tallosan RC, a sulfonated tallow marketed by General Dyestuff Corporation; Acidolate, a sulfonated oil marketed by White Laboratories, Inc.; and Chemoil 412, a sulfonated castor oil marketed by Standard Chemical Company.

Various sulfonated and sulfated fatty acid esters of mono and polyvalent alcohols are also suitable such as Nopco 2272R, a sulfated butyl ester of a fatty ester marketed by Nopco Chemical Company; Nopco 1471, a sulfated vegetable oil marketed by Nopco Chemical Company; Sandozol N, a sulfated fatty ester marketed by Sandoz, Inc.; and Stantex 322, an ester sulfate marketed by Standard Chemical Products, Inc.

Sulfated and sulfonated fatty alcohols are also useful as the additional emulsifier and include anionic agents such as Dupanol ME, a sodium lauryl sulfate, Duponal L142, a sodium cetyl sulfate, Duponal LS, a sodium oleyl sulfate which are marketed by E.I. duPont de Nemours and Company; and Tergitol 4, a sodium sulfate derivative of 7 ethyl-2 methyl, 4-undecanol, Tergitol 7, a sodium sulfate derivative of 3,9-diethyl tridecanol-6, and Tergitol 08, a sodium sulfate derivative of 2-ethyl-1-hexanol, which are marketed by Union Carbide Corporation, Chemical Division.

Nonionic emulsifiers can also be employed and include various ethylene oxide condensation products with fatty acids, alcohols and glycerides, phenolic compounds, fatty amides, amines, and fatty acid partial esters of hexitans. Examples of ethylene oxide condensation products with fatty acids are the following: Ethofat C/15, Ethofat 142-20, Ethofat 0/15, Ethofat 60/20 which are marketed by Armour Industrial Chemical Company.

Examples of ethylene oxide condensation products with fatty and rosin alcohols are: Brij 30, a polyoxyethylene lauryl ether marketed by Atlas Chemical Industry and the Alfonic series, ethylene oxide adducts of straight chain fatty alcohols marketed by Continental Oil Company.

Examples of ethylene oxide condensation products with alkyl and alkenyl phenols are Igepal CA-520, Igepal CA-620, Igepal CA-630, etc. which are octyl phenoxypolyethoxy ethanol marketed by General Aniline and Film Corporation; Triton series which are phenoxypolyethoxy ethanol marketed by Rohn and Haas Company, etc.

Examples of ethylene oxide condensation products with fatty amides and amines are the Ethomeens and Ethomides prepared by condensation of ethylene oxide with fatty acid amines and amides having from 8 to 18 carbons and marketed by Armour Industrial Chemical Company.

Ethylene oxide condensation products of fatty acids partial esters of hexitans are suitable emulsifying agents in our invention. These agents are commercially available as the various Span and Tween products marketed by Atlas Chemical Industry and are polyoxyethylene derivatives of sorbitan monostearate, sorbitan monooleate, sorbitan trioleate, etc.

Cationic emulsifiers can also be employed and include various amines such as Ethoquad C/12, Ethoquad 0/25, Ethoquad 18/12 which are polyethoxylated quaternary ammonium salts marketed by Armour Industrial Chemical Company; Indulin W-1, a lignin derivative marketed by West Virginia Pump and Paper Co.; Katopone VP-532 and Katapol PN-430 which are polyoxyethylated alkylamines marketed by General Aniline and Film Corporation; Romine O, an oleyl imidazoline marketed by Rozilda Laboratories, Inc.; Triton X-400, a steryl dimethyl benzyl ammonium chloride marketed by Rohm and Haas Company; Variquat 638, K300 and L200 which are ethoxylated quaternary, dicoco dimethyl ammonium chloride and alkenyl trimethyl ammonium chloride, respectively, and marketed by Varney Chemical Corporation; and Amine C, O, S, and T, which are heterocyclic tertiary amines marketed by Geigy Industrial Chemicals.

The sulfur particles which may be employed in accordance with this invention must be of a size suitable for agricultural dusting and also in a form which is stable at normal ambient temperatures. Since only rhombic sulfur is stable by itself at temperatures below 130° F., it is preferred that the dusting sulfur be in the rhombic form, i.e., alpha sulfur. It is recognized, however, that minor amounts of other sulfur forms may be present such as monoclinic sulfur, etc. These forms are unstable at ambient conditions and the sulfur ultimately reverts to the rhombic state.

The size of the particulate sulfur can vary over a wide range depending upon the uses for which the sulfur is employed. In most agricultural dusting, the average weighted particle size generally ranges from 50 mesh US standard sieve to about 1 micron, and usually between about 200 mesh US standard sieve and 5 microns. I have found that sulfur having a particle size which will pass a 300 mesh US standard sieve is particularly effective in dusting operations.

The invention is further illustrated by the following examples which are illustrative of specific embodiments of this invention and which are not intended as limiting the scope of the invention as defined by the appended claims.

EXAMPLE 1

This example illustrates numerous free-flowing sulfur compositions of this invention. In each composition, 200 grams of powdered sulfur of selected average weighted size ranges are admixed with 0.1 particle percent of a hydrocarbon dissolved in 30 milliliters of normal pentane. The sulfur is tumbled in a rotating mixing drum for 2 hours at ambient temperatures so that all of the pentane is vaporized. The resulting mixtures having free-flowing properties are shown below in Table II.

TABLE II

Sulfur Compositions

| Size (Mesh, U.S. Standard Sieve) | Hydrocarbon Additive | Hydrocarbon[1] Average Carbon No. |
|---|---|---|
| 20–200 | Kerosene | 10 |
| 100–200 | Kerosene | 10 |
| below 200 | Kerosene | 10 |
| 20–200 | Diesel Oil | 13 |
| 100–200 | Diesel Oil | 13 |
| below 200 | Diesel Oil | 13 |
| 20–200 | 90 Neutral Lube Oil | 25 |
| 100–200 | 90 Neutral Lube Oil | 25 |
| below 200 | 90 Neutral Lube Oil | 25 |
| 20–200 | n-Butyl Cyclohexane | 10 |
| 100–200 | n-Butyl Cyclohexane | 10 |
| below 200 | n-Butyl Cyclohexane | 10 |
| 20–200 | Paraffin Wax | 30 |
| 100–200 | Paraffin Wax | 30 |
| below 200 | Paraffin Wax | 30 |
| 30–200 | Octadecene | 18 |
| 100–200 | Octadecene | 18 |
| below 200 | Octadecene | 18 |
| 20–200 | Gas Oil | 20 |
| 100–200 | Gas Oil | 20 |
| below 200 | Gas Oil | 20 |

[1]The average number of carbon atoms per molecule.

EXAMPLE 2

This example illustrates a method of dispersing the liquid hydrocarbon on particulate sulfur. In this method a stream of ambient water is forced through a one-half inch venturi nozzle at a velocity of approximately 20 feet per second. The discharge portion of the nozzle is vented at a 70° angle to the atmosphere. Molten sulfur is injected into the vena contracta of the nozzle at a rate of about 1 pound of sulfur for every 2 pounds of discharging water. Approximately 0.01 pounds of 300 neutral lube oil per pound of water is injected into the fast moving water 13 inches upstream from the nozzle.

The sulfur particles made from the nozzle are discharged into a pile where the water is drained off and recycled. The particles are dried and their size and hydrocarbon content measured. The particles have a size in which a weight majority is retained by a 10 mesh U.S. Standard sieve. The particles are ground into a fine powder having an average size passing a 250 mesh screen and found to have good free-flowing properties.

EXAMPLE 3

This example illustrates the effectiveness of hydrocarbon additives in reducing the caking properties of powdered sulfur. In each test 200 grams of powdered dusting sulfur, 98 percent of which passes through a 325 mesh US standard screen, is placed in a rotating drum mixer. The sulfur is then sprayed with 30 milliliters of a solution consisting of normal pentane containing 0.2 gram of the hydrocarbon anticaking additive. The sulfur is then tumbled within the mixer for 2 hours at ambient temperatures and atmospheric pressure so that all of the pentane is vaporized from the sulfur particles. Five grams of this treated sulfur is placed in a 1-inch diameter cylindrical press and compressed at a pressure of approximately 5000 psig. The compressed one-inch diameter sulfur tablet is then removed and placed facewise between the rectangular crushing jaws of a press, each jaw having the dimensions one-eighth by three-eighths inch. The pressure on the jaws is slowly increased until the sulfur tablet breaks. The highest pressure required to crush the tablet is considered the crushing pressure and is reported in Table III for various hydrocarbon anticaking additives.

While the crushing pressure does not measure the sulfur caking properties directly, it reliably indicates the effectiveness of various agents in changing the caking properties since those additives which reduce the crushing pressure also tend to reduce the caking tendencies of the sulfur particles.

TABLE III.—CRUSHING PRESSURE OF SULFUR TABLETS

| Run | Hydrocarbon additive [1] | Concentration in sulfur (weight percent) | Crushing strength (p.s.i.g.) |
|---|---|---|---|
| 1 | Light mineral oil | 0.1 | 39 |
| 2 | 90 Neutral lube oil | 0.1 | 39 |
| 3 | 90 Neutral lube oil with emulsifier [2] | 0.1 | 32 |
| 4 | 300 Neutral lube oil | 0.1 | 26 |
| 5 | 150 Bright Stock | 0.1 | 40 |
| 6 | 80 Neutral phenol extract | 0.1 | 40 |
| 7 | 170 Neutral phenol extract | 0.1 | 38 |
| 8 | None | | 62 |

[1] The hydrocarbon additives are described more completely in Table IV.
[2] The emulsifier is an alkylaryl polyether alcohol marketed by the Rohm and Haas Company under the trademark Triton 207.

TABLE IV.—PROPERTIES OF THE HYDROCARBON ADDITIVES

| Hydrocarbon additive | Gravity, °API | Viscosity, SSU at 100° F. | Average carbon number (approx.) |
|---|---|---|---|
| 90 Neutral lube oil | 31 | 87 | 25 |
| 300 Neutral lube oil | 29 | 317 | 30 |
| 150 Bright Stock | 25 | 3,200 | *40 |
| 80 Neutral phenol extract | 20 | 110 | 23 |
| 170 Neutral phenol extract | 13 | 880 | 28 |

* Estimated.

It is readily apparent that the addition of the hydrocarbon additive to the sulfur particles reduces the required crushing strength up to two and one-half times.

EXAMPLE 4

This example is presented to illustrate the effect of hydrocarbon concentration on the caking properties of powdered sulfur. The sulfur is treated in the same manner as described in Example 3 except that in each case the hydrocarbon additive is 300 neutral lube oil. The concentration of additive is varied from 0 to 2 weight percent in 9 separate tests and the crushing strength for each sample is determined and reported in Table V.

TABLE V

| Run | Hydrocarbon Concentration (weight percent) | Crushing Strength (psig) |
|---|---|---|
| 1 | 0 | 62 |
| 2 | 0.01 | 60 |
| 3 | 0.03 | 47 |
| 4 | 0.05 | 37 |
| 5 | 0.10 | 26 |
| 6 | 0.3 | 24 |
| 7 | 0.7 | 23 |
| 8 | 1.0 | 24 |
| 9 | 2.0 | 27 |

It is apparent from the above table that the hydrocarbon concentration substantially effects the caking properties of the particulate sulfur and that the optimum hydrocarbon concentration is between about 0.1 and 1.0 weight percent.

The aforementioned illustrative compositions are not intended to unduly limit the invention, but rather it is intended that all obvious equivalents to such composition which are described herein are within the scope of the invention.

I claim:
1. A method of making a free-flowing sulfur composition which comprises contacting particulate rhombic sulfur having a size capable of passing a 50 mesh U.S. Standard sieve with an organic liquid solvent containing about 0.01 to 2 weight percent based on the weight of said sulfur of a liquid hydrocarbon having from about 6 to 50 carbon atoms; admixing said particulate sulfur and said organic solvent to distribute the solvent and contained hydrocarbon uniformly on the sulfur particules and thereafter vaporizing said organic solvent from said particulate sulfur; said organic solvent having a boiling point below the boiling point of said hydrocarbon and selected from the group consisting of alkanes, alkanols, ethers, esters and amides having from 2 to 6 carbon atoms.

2. The method defined in claim 1 wherein said organic liquid solvent is an alkane having from about 2 to 6 carbon atoms and wherein 0.01 to 2 weight percent of said hydrocarbon is left on said particulate sulfur after said organic liquid solvent is vaporized from the particles.

3. A method of dispersing a hydrocarbon component on particulate sulfur which comprises:
   discharging water through a nozzle at a velocity of from 10 to 90 feet per second into a vapor space, said water containing dispersed therein from 0.01 to 10 parts per part of water of a liquid hydrocarbon having from about 10 to 40 carbon atoms;
   injecting molten sulfur into said water at the center of said nozzle at the rate of from 5 to 150 parts of sulfur per 100 parts of water; and
   allowing said molten sulfur to solidify in said vapor space to form particles of rhombic sulfur having a pore volume between about 0.06 and 0.20 cubic centimeters per gram.

4. The method defined in claim 3 wherein a sufficient amount of hydrocarbon is dispersed in said water so as to coat the sulfur particles with from 0.01 to 2 weight percent of said hydrocarbon.

5. The method defined in claim 3 wherein an antioxidant is admixed with said hydrocarbon.

6. The method defined in claim 3 wherein an emulsifying agent is admixed with said hydrocarbon in an amount sufficient to disperse the hydrocarbon in said water.

* * * * *